(12) United States Patent
Görnerup

(10) Patent No.: US 6,689,189 B1
(45) Date of Patent: Feb. 10, 2004

(54) METALLURGICAL PRODUCT

(75) Inventor: Mårten Görnerup, Stockholm (SE)

(73) Assignee: Uddeholm Technology Aktiebolag, Uddeholm (SE)

( * ) Notice: Subject to any disclaimer, the term of this patent is extended or adjusted under 35 U.S.C. 154(b) by 0 days.

(21) Appl. No.: 09/786,249

(22) PCT Filed: Jul. 19, 1999

(86) PCT No.: PCT/SE99/01290

§ 371 (c)(1),
(2), (4) Date: Mar. 2, 2001

(87) PCT Pub. No.: WO00/14287

PCT Pub. Date: Mar. 16, 2000

(30) Foreign Application Priority Data

Sep. 3, 1998 (SE) ............................................. 9802976

(51) Int. Cl.⁷ ................................................ C22B 1/14
(52) U.S. Cl. ........................................... 75/316; 75/331
(58) Field of Search ............................. 75/10.63, 10.66, 75/331, 316, 567

(56) References Cited

U.S. PATENT DOCUMENTS 5,395,420 A    3/1995  Masucci ..................... 75/10.41
5,611,838 A    3/1997  Fritz et al. ................. 75/10.38
6,287,362 B1 * 9/2001  Levey et al. ................... 75/331

FOREIGN PATENT DOCUMENTS

EP    0 829 545     3/1998
WO    98/58091     12/1998

* cited by examiner

*Primary Examiner*—Melvyn Andrews
(74) *Attorney, Agent, or Firm*—Nixon & Vanderhye

(57) ABSTRACT

The present invention relates to a method for the production of abulk of molten steel in an electric arc furnace, comprising the formation of a foaming top slag. During at least one phase of the production process, a doping agent is added to the top slag with the aim of creating improved conditions for the reduction of the oxidized, valuable metal elements which exist in the top slag. The doping agent has a chemical composition containing 0–5% Si, 2–7% C, 0–3% Mn, the remainder essentially only iron and impurities which can normally appear in raw iron produced in the blast furnace process or other reduction process, a melting point <1350 ° C. and consists essentially homogeneous particles with substantially round or oval shape, obtainable through granulation of a melt with above-mentioned composition, comprising the disintegration of a stream of said melt to drops, which are cooled in a water bath to form a granulate.

6 Claims, No Drawings

METALLURGICAL PRODUCT

FIELD OF INVENTION

The present invention relates to a method for the production of a bulk of molten metal, preferably molten steel in an electric arc furnace, comprising the formation of a foaming top slag with a temperature of 1400–1800° C. and the supply of oxygen in the form of oxygen gas and/or other oxygen carriers, e.g. metallic oxides, to the molten metal in order to oxidize at least part of the existing silicon in the melt for heat generation and to oxidize at least part of the carbon in the melt for heat generation and to generate gas in the form of CO and/or $CO_2$ which contributes to the slag foaming, by which the supply of oxygen to the melt also brings about oxidation of metal elements other than silicon in the melt, in this text generally referred to as valuable metal elements, which go into the slag and are reduced there by the addition of reduction agents to the top slag so that these elements to a considerable degree are recovered to the melt.

The invention relates as well to a metallurgical product useable as a doping agent in the production of molten metal, preferably molten steel, in an electric arc furnace to create favourable conditions for the reduction of oxidized, valuable metal elements which have accumulated in the top furnace slag, where the metallurgical product itself participates in the reduction process, contributing to and/or maintain foaming of the top slag as well as giving a surplus of metal to the melt. The invention relates as well to the use of such a metallic product.

BACKGROUND OF THE INVENTION

Most electric arc furnaces are distinct melting machines, and there is an ongoing search for new means in achieving higher power supply to decrease tap-to-tap times. The thermal loading on the furnace walls and roof during the refining period however limit the maximal effect which can be applied during this stage. By using a foaming slag the radiation from the electric arcs can be shielded, which brings about decreased thermal loading on the surroundings. Further favourable effects are more stable electric arcs and improved heat transfer to the melt. Foamy slag practice according to known techniques comprises the injection of oxygen as well as carbon and/or carbon carriers. Oxygen is injected into the steel to form oxides, which are transferred to the slag, where they are to be reduced by the carbon injected into the slag. $CO/CO_2$ (g) is formed in the slag during the reduction phase, and the gas-slag emulsion forms a foam.

The foaming of slag in general and in electric arc furnaces in particular has been studied theoretically as well as in practical application and has been a well-established technique for many years in modern electric arc furnace steel making. The following references may be mentioned here:

Cooper, C. F. and Kitchener, J. A.; *The foaming of molten silicates*, J. Iron and Steel Inst., Vol. 193, pg. 48–55, 1959.

Hara, S., Ikuta, M., Kitamura, M. and Ogino, M.,; *Foaming of molten slags containing iron oxide*, Tetsu-to-Hagane, Vol. 69, pg. 1152–1159, 1983.

Ito, K. and Fruehan, R. J.; *Slag foaming in electric furnace steel making*, Trans. of the ISS (I&SM), Aug., pg. 55–60, 1989.

Jiang, R. and Fruehan, R. J.; *Slag foaming in bath smelting*, Met. Trans., B, Vol. 22B, pg. 481–489, 1991.

Zamalloa, M., Warczok, A. and Utigard, T.; *Slag foaming during gas injection*, Electric Arc Furnace Proc., Vol. 49, Toronto, Canada, pg. 197–204, 1991.

Masucci, P.; *Process for using foamed slag in stainless steel production*, U.S. Pat. No. : 5,395,420, 1995.

Even though the foaming of slag has become a well-established technique and is used on a large scale in the production of steel in the electric arc furnace, it is, at least considering the production of high-alloy steels such as stainless steels, still associated with a number of problems which have not yet been solved in a satisfactory manner. One problem has to do with the actual formation and maintenance of an active amount of foam, which requires the supply of large amounts of carbon, of which large parts will not participate at all in either the foaming or reduction processes, but rather disappear with slag and off-gases. Another problem relates to the reduction reactions in the foaming slag, which are generally slow, as nucleation sites are scarce. Molten metal does certainly splash up into the slag to a certain degree, but this is insufficient for the generation of nucleation sites to the extent necessary for achieving the desired reduction rate. To avoid unacceptably long tap-to-tap times, therefore, it is usual that the melt is tapped before valuable metals have been reduced back to the desired degree, which implies loss of valuable metals and problems with the handling of remaining slag. To speed up the reduction process, it has therefore been proposed to dope the slag with fine-grained iron carriers such as filter dust or other metallurgical dust ore concentrate, iron carbide, mill scale, dried metallurgical sludge, iron powder and low-phosphorus pig iron chips or NiO, as described in the following references:

Fudala, B; *Process for recycling the filter dust in an electric arc furnace for producing steel*, U.S. Pat. No. : 5,493,580, 1996.

Frits et al; *Process for producing an iron melt*, U.S. Pat. No. : 5,611,838, 1997.

Görnerup, M; *Studies of Slag Metallurgy in Stainless Steel making*, Doctoral Thesis, Div. of Process Metalurgy, Dept. of Metallurgy, KTH,S-100 44 Stockholm, Sweden, 1997.

It has been reported in the above references that the rate of reduction in the slag is increased considerably by the addition of the above-mentioned types of material. Still certain problems remain. One of these has to do with the physical characteristics of the added reduction- and/or doping agents, which can cause a large part of them to disappear before reacting with the oxides in the slag. This implies a cost for lost material, but even more problematic is that a good reproducibility of results in the process, becomes difficult to achieve. The addition of elementary carbon in the form of powder is still a problem as a large part of the material is lost on addition, decreasing the reproducibility of the process. Pig iron in the form of chips, which has also been proposed, and which can be formed as a residual product from splashing, burrs etc. and in the working of pig iron, is usually contaminated and is for this reason unsuitable as a doping agent. Furthermore, it is from a physical point of view unsuitable to use e.g. mill scale and similar product forms where the particles have large area/volume ratios.

DESCRIPTION OF THE INVENTION

The object of the present invention is to attack the above complex of problems to improve the method for producing a melt in an electric arc furnace which is described in the introduction of this patent application. Characteristic for the invention is that during at least one phase of the production process, a doping agent in the form of a particle-formed, granulated product is added to the top slag with the aim of improving conditions for the reduction of the oxidized, valuable metal elements existing in the slag, as well as participating in the reduction process, contributing to and/or maintaining the slag foaming as well as providing an addition of metal to the melt, where said doping agent fulfills the following requirements, namely:

a) that it has a chemical composition containing 0–5% Si, 2–7% C, 0–3% Mn, the remainder essentially only iron and impurities which can normally exist in pig iron made in the blast furnace process or other reduction process.

b) that it has a melting point <1350° C., and c) that it consists of essentially homogeneous particles with substantially round or oval form, obtainable through granulation of a melt with the above-mentioned composition, comprising disintegration of a stream of said melt to drops, which are cooled in a water bath to form a granulate.

For the production of the granulate, a specific method can be used, the general principles of which are described in the U.S. Pat. No. 3,888,956. By this known method, raw iron granulate can be produced, in which at least 90 weight-% of the granulate consists of particles with shapes varying from substantially round or oval slices to drops and spheres with sizes varying from 1 mm up to 25 mm measured in the largest dimension of the granules. The granulate can be used in this form as the above-mentioned doping agent according to the invention. The largest particles will however sink quite rapidly through the slag and join the melt, before they have had a chance to participate in the reduction processes to a significant degree. This can be tolerated in many cases, as the granulate also contains a large portion of particles which have a shape and size suitable for use as doping agent according to the invention. As these larger particles reach the melt before reacting with the slag to a significant degree, they will be incorporated into the melt and make themselves useful there through their iron content and because carbon and silicon react with supplied oxygen to exothermically form carbon oxide and/or carbon dioxide, and silicon dioxide respectively.

There are however disadvantages connected with the doping agent being used as a granulate which, besides particles with a size desirable as doping agent, even contain granules with larger sizes than that which is desired in a granulate with the role of doping agent. These larger particles can seem to hinder the formation of foam, cool the foaming slag as well as diluting the melt with iron, which is undesirable in certain cases, as in e.g. the production of highly alloyed stainless steels. It can therefore be suitable at least in certain cases to use a granulated product of said slag as doping agent, of which at least 80 weight-% consists of particles with a particle size varying between 0.5 and 8 mm measured in the largest dimension of the particles. The rounder the particles, the more favourable they are with respect to their ability to penetrate the slag and to keep themselves floating in the slag with the aid of gas formation, where the gas is attached to the particles for a considerable length of time. The granulate resides in the slag for a sufficiently long time so that it not only melts, which it does relatively quickly, but also so that the content of carbon and silicon in the granulate manage to react with the oxides of the valuable metal elements in the slag, and to gradually agglomerate to larger agglomerates of molten metal, which sink down through the slag to join the melt. In contrast, irregularly shaped flakes, mill scale, fine powder etc. have very poor penetration ability.

There are several different ways of achieving an agglomerate consisting of homogeneous particles with said shape and said chemistry, where at least 80 weight-% consist of particles with a particle size varying between 0.5 and 8 mm, considered in the largest dimension of the particles, preferably with a size varying between 1 and 5.5 mm. For example the size and shape of the granulate produced by the method described in said U.S. Pat. No. 3,888,956 is regulated by variation of the height of fall of the molten stream before it disintegrates to drops and/or by the height of fall of the drops before they meet the water surface in the cooling bath. As a complement and/or alternative, the obtained granulate can be screened, so that the desired size fraction is obtained.

The addition of doping agent can be made through a lance with a gas carrier, where the lance can be placed through the slag door, furnace wall or furnace roof, or by mechanical feeding from a position above the slag, in the furnace wall or furnace roof. The added doping particles melt quickly in the hot slag and form small drops with large boundary layer area between liquid metal phase and slag, which kinetically favours reduction of metallic oxides. The doping agent contains active contents of dissolved carbon and silicon, which participate as melted drops in the reduction reactions. Dissolved carbon forms $CO/CO_2$-gas, which in turn generates and/or maintains the foaming slag and helps to keep the small metal drops suspended in the slag. The achieved reduction and, foaming implies a number of advantages in the process, which in certain cases can be vital for obtaining an economically acceptable furnace operation. Thus, the carbon dissolved in the doping agent has several functions: it contributes to and/or maintains formation of the foaming slag, it contributes to keeping the small, molten metal drops suspended in the slag, which maintains the foaming, and it participates in the reduction processes.

Also the silicon which is dissolved in the doping agent has several functions. Silicon contributes to the reduction of oxidized valuable metal elements, which most probably decreases the boundary layer tension between slag and doping agent, which further accelerates the reduction reaction. Furthermore, heat is formed through the oxidation of dissolved carbon and silicon. Oxidation of dissolved silicon contributes as well to the formation of slag in the furnace. Finally, the doping agent contributes to a significant addition of iron to the melt when most of the reduction agents—C and Si—in the doping agent have reacted with the slag and a number of smaller drops have agglomerated to larger drops which then sink down through the slag layer into the metal bath.

The raw material of the granulate, which forms the doping agent according to the invention, or from which the doping agent can be obtained by screening or other methods, can be made from a molten raw iron from a blast furnace process or other reduction process, possibly after certain refining, e.g. sulphur removal. However the contents of carbon and silicon, which comprise the essential elements in the doping agent according to the invention, vary most considerably from blast furnace to blast furnace. In order for the doping agent to be useful as a commercial product of high value, with which the electric arc furnace top slag can be doped to produce the desired result from heat to heat, it is desirable that the contents of carbon and silicon in the doping agent be kept within relatively narrow limits within the stated outer limits. Thus the contents of carbon and silicon should not vary more than +/−0.5%, preferably not more than +/−0.3% from the assigned target value within said outer limits. Thus the carbon content in the doping agent should go up to $(C_x+/-0.5)\%$, where $C_x$ is a number between 3 and 4.5. Preferably the carbon content should be $(C_x+/-0.3)\%$. In a corresponding way the silicon content should be $(Si_x+/-0.5)$ %, preferably $(Si_x+/-0.3)$%, where $Si_x$ is a number between 1 and 2.5. The desired contents of carbon and silicon can be obtained through alloying the raw iron with carbon and silicon after possible desulphurization or other treatment of the raw iron.

The amount of added doping agent can be varied within wide limits depending on the composition of the melt, the composition of the doping agent and other factors. Normally the amount of doping agent added to the slag according to the, invention can go up to between 5 and 80 kg of doping agent per ton produced steel, which is added to the slag by injection into the slag or in another manner to maintain slag foaming and reduction. Simultaneously, oxygen is added in a balanced amount to the steel to oxidize mainly Si and C in the steel to obtain heat and gas for the slag foaming. Also other metal elements in the steel, e.g. Fe and Cr, are oxidized to a certain degree and then reduced again when they reach the slag. Other reduction agents may also be added, besides the doping agent according to the invention, e.g. C or Si, to the slag in order to ensure the reduction together with the doping agent according to the invention.

The invention is applicable in all metallurgical melting processes where reduction of metallic oxides with a melting point above the process temperature is to occur, including in the production of unalloyed steels, but is especially suitable for the production of steel which contains more than 2% Cr, in particular stainless steels which contain at least 17% Cr, as the invention solves the problems which are particularly related to the reduction and recovery of chromium from the top slag in electric arc furnaces.

What is claimed is:

1. Metallurgical product suitable for use as a doping agent in the production of melts of stainless steel containing at least 13% Cr in electric arc furnaces to create favorable conditions for the reduction of oxidized, valuable metal elements, including chromium, which have accumulated in a furnace top slag, for participating in the reduction processes themselves, for contributing and/or maintaining foaming of the top slag and for giving an addition of metal to the melt, said product having a composition consisting essentially of 0–5% Si, 2–7% C, 0–3% Mn, the remainder essentially only iron and impurities which can normally occur in raw iron produced in a blast furnace process or other reduction process, said product having a melting point of <1350° C., said product consisting of essentially homogeneous particles with substantially round or oval shape, obtainable through granulation of a melt with said composition, wherein a stream of said melt is subjected to disintegration to form drops and said drops are cooled in a water bath to form a granulate, at least 80 weight-% of said particles consisting of particles with a particle size varying between 0.5 and 8 mm, measured in the largest dimension of the particles.

2. Metallurgical product according to claim 1, consisting essentially of 0.2–3% Si, 2–5% C, 0.1–3% Mn.

3. Metallurgical product according to claim 2, wherein at least 80 weight-% of the particles have a size between 1 and 5.5 mm measured in the largest dimension of the particles.

4. Metallurgical product according to claim 1, having a carbon content of 2.5–4.5%.

5. Metallurgical product according to claim 1, having a silicon content of 1–3%.

6. Metallurgical product suitable for use as a doping agent in the production of melts of stainless steel containing at least 17% Cr in electric arc furnaces to create favorable conditions for the reduction of oxidized, valuable metal elements, including chromium, which have accumulated in a furnace top slag, for participating in the reduction processes themselves, for contributing and/or maintaining foaming of the top slag and for giving an addition of metal to the melt, said product having a composition consisting essentially of 0–5% Si, 2–7% C, 0–3% Mn, the remainder essentially only iron and impurities which can normally occur in raw iron produced in a blast furnace process or other reduction process, said product having a melting point of <1350° C., said product consisting of essentially homogeneous particles with substantially round or oval shape, obtainable through granulation of a melt with said composition, wherein a stream of said melt is subjected to disintegration to form drops and said drops are cooled in a water bath to form a granulate, at least 80 weight-% of said particles consisting of particles with a particle size varying between 0.5 and 8 mm, measured in the largest dimension of the particles.

* * * * *